(12) United States Patent
Ratermann et al.

(10) Patent No.: US 7,450,903 B2
(45) Date of Patent: Nov. 11, 2008

(54) METHOD FOR OPERATING A SHORT HAUL RADIO TRANSMITTING/RADIO RECEIVING SYSTEM CONFORMING TO A SHORT HAUL RADIO COMMUNICATION STANDARD AND A MASTER DEVICE FOR IMPLEMENTING SAID METHOD

(75) Inventors: Albert Ratermann, Bocholt (DE); Martin Schanzmann, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 118 days.

(21) Appl. No.: 10/562,846

(22) PCT Filed: Jan. 28, 2004

(86) PCT No.: PCT/EP2004/000756

§ 371 (c)(1),
(2), (4) Date: Dec. 29, 2005

(87) PCT Pub. No.: WO2005/002146

PCT Pub. Date: Jan. 6, 2005

(65) Prior Publication Data

US 2006/0234629 A1 Oct. 19, 2006

(30) Foreign Application Priority Data

Jun. 30, 2003 (DE) ................. 103 29 377

(51) Int. Cl.
*H04B 7/00* (2006.01)
(52) U.S. Cl. .................. 455/41.2; 455/41.1; 455/41.3; 455/512; 370/449

(58) Field of Classification Search ............... 455/41.3, 455/41.2, 41.1, 507, 509, 512; 370/449, 370/455

See application file for complete search history.

(56) References Cited

U.S. PATENT DOCUMENTS

| | | | | |
|---|---|---|---|---|
| 6,907,227 B2 * | 6/2005 | Fujioka | | 455/41.3 |
| 7,088,691 B2 * | 8/2006 | Fujita | | 370/311 |
| 2002/0193073 A1 | 12/2002 | Fujioka | | |
| 2004/0214527 A1 * | 10/2004 | Lim et al. | | 455/41.2 |

FOREIGN PATENT DOCUMENTS

| | | |
|---|---|---|
| EP | 1 294 130 | 3/2003 |
| JP | 02002064512 | * 2/2002 |

OTHER PUBLICATIONS

XP-001067139—Lee et al., "Model and Performance Evaluation of a Piconet for Point to Multipoint Communications in Bluetooth", pp. 1144-1148, May 2001.

XP-000968001—Kalia et al., "Efficient Policies for Increasing Capacity in Bluetooth: An Indoor Pico-Cellular Wireless System", pp. 907-911, May 2000.

\* cited by examiner

*Primary Examiner*—Yuwen Pan

(57) ABSTRACT

A method and apparatus for operating a short-haul radio transmitting/radio receiving system conforming to a short-haul radio communication standard wherein a maximum number of devices able to communicate is exceeded. The devices exceeding the maximum number of devices communicating with a master device are switched to a park mode and, continually in keeping with a predefined strategy, parked devices are switched to active while active devices are switched to parked.

5 Claims, 2 Drawing Sheets

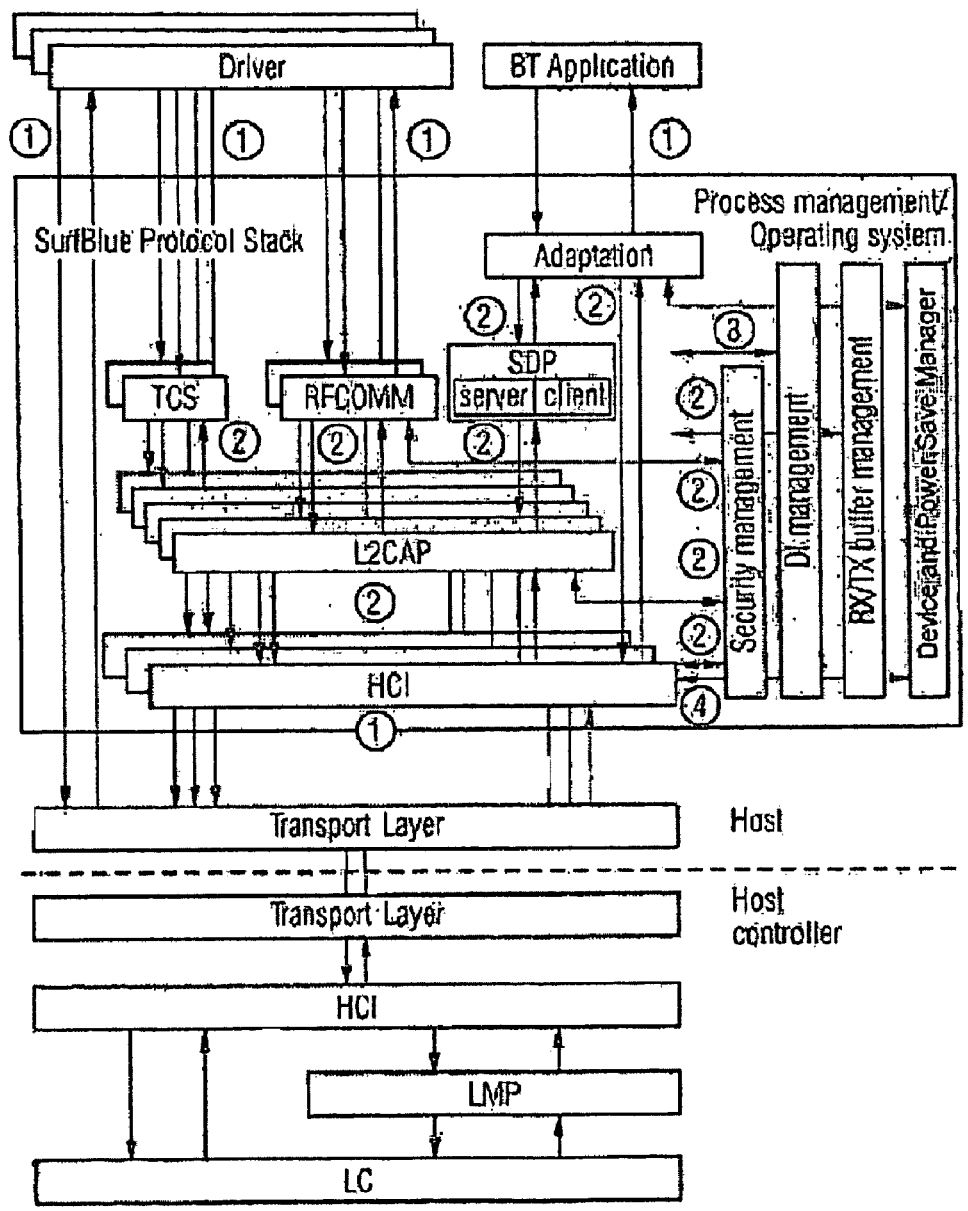

FIG 2

| | STATUS OF DEVICES: | | | | OPERATION |
|---|---|---|---|---|---|
| | G1 | G2 | G3 | G4 | |
| 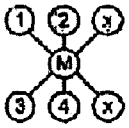 | A | A | P | P | - G3 sends data<br>- Depark G3 |
| X1 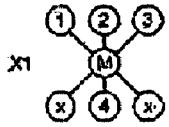 | A | A | A | P | - Park G1 so as to keep an active position free even though a data flow is still present |
| 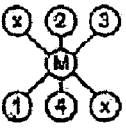 | MUX | A | A | P | - G1 sends data until the memory is full<br>- Wait until a data transfer has been completed<br>- Depark G1 |
| 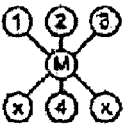 | A | A | A | P | - Park G2 so as to keep an active position free even though a data flow is still present |
| 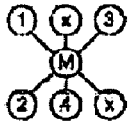 | A | MUX | A | P | - G2 sends data until the memory is full<br>- Wait until a data transfer has been completed<br>- Depark G2 |
| 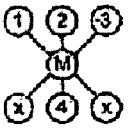 | A | A | A | P | - Park G3 so as to keep an active position free even though a data flow is still present |
| 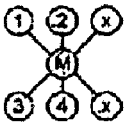 | A | A | MUX | P | - G3 sends data until the memory is full<br>- Wait until a data transfer has been completed<br>- Depark G3<br><br>- Continue at mark X1 or X2 |

METHOD FOR OPERATING A SHORT HAUL RADIO TRANSMITTING/RADIO RECEIVING SYSTEM CONFORMING TO A SHORT HAUL RADIO COMMUNICATION STANDARD AND A MASTER DEVICE FOR IMPLEMENTING SAID METHOD

FIELD OF TECHNOLOGY

The present disclosure relates to a method for operating a short-haul radio transmitting/radio receiving system conforming to a short-haul radio communication standard.

SUMMARY

The Bluetooth standard is a short-haul radio standard that functions using carrier frequencies from the globally non-licensed "Industrial", "Scientific", "Medical" (ISM) 2.4 GHz band and enables wireless connecting of terminals (devices) in a radio cell having a radius of up to 10 meters, in special cases even up to and above 100 meters, with said carrier frequencies being changed in a (pseudo) random sequence up to 1600 times a second in order to prevent radio interference. Up to 79 frequencies (channels) in the range between 2.402 and 2.480 GHz are provided for this what is termed "frequency hopping" technique.

Up to eight devices operating in conformity with the Bluetooth standard can be combined in the radio cell, referred to also as a "pico cell", into a network termed a "piconet" and communicate with each other, with its being possible in a manner implemented using time-division multiplex techniques for the individual devices to be members of a plurality of piconets so that said piconets are linked thereby into what is termed a "scatter network".

Each device in a piconet is able to initialize the network. Since a device that has initialized a piconet controls said piconet's other members and synchronizes their timers it is referred to as the "master" (device master), while said piconet's other members are referred to as "slaves".

Devices that are members of a plurality of piconets and which combine said piconets, distinguishable by different hopping-channel sequences, into scatter networks, synchronize themselves in each multiplex timeslot with the respectively current master.

Prior to establishing a connection in the piconet, Bluetooth devices are in a power-saving "standby mode". This is not a power-saving mode in the Bluetooth sense but signifies rather that the device has been initialized and is ready to establish or accept connections. There is accordingly no cyclic searching for messages in the network in this condition, there being no network at this time. A response is made at most to a device search (inquiry). However, this process is initiated by another device (remote device) so is not subject to a time scheme.

A number of further power-saving functions are possible apart from standby mode without a network connection. In the "hold mode" the device remains integrated into the piconet but no data is transmitted. Only an internal timer continues running in the slave. When necessary, data transmission will start without any delay. The hold mode can be directed for the slave by the master. On the other hand, the slave can request the master to switch it to said mode.

In the "sniff mode" the device listens to the network at programmable intervals. Here, too, the timer for synchronizing continues running in the slave.

It is furthermore possible to park devices in the network ("park mode"). Then losing its address in the network, the device will henceforward only be able to keep track of the network traffic and will synchronize its internal timer with that of the master at longer intervals.

It is disadvantageous that a master device conforming to, for example, the Bluetooth standard can communicate only with a maximum of 7 further devices.

Documents (1) U.S. Patent Application 2002/0193073 titled "Method and System for Managing Wireless Connection Between Slave Terminals and Master Terminal"; (2) XP-000968001 titled "Efficient Policies for Increasing Capacity in Bluetooth An Indoor$PICO Cellular Wireless System", Kalia et al; and (3) XP-001067139 titled "Model and Performance Evaluation of a Piconet for Point to Multipoint Communications in Bluetooth", Lee et al., disclose that when there are more than 7 devices the devices exceeding the number 7 will be switched to a park mode and that, continually in keeping with a predefined strategy, parked devices will be switched to active and active devices to parked. Each of the aforementioned documents are incorporated by reference in their entirety herein.

It is disadvantageous that when a parked device is to be switched to active an active device first has to be switched to parked. That takes time, which the device requiring to be switched to active must wait to elapse before it can be switched to active.

SUMMARY

A method and a master device is presently disclosed, wherein the maximum number of devices able, to communicate with each other are split up in such a way that when there are devices exceeding said specified maximum number, devices requiring to be switched to active can be switched to active as quickly as possible.

Accordingly, the aforementioned method, not only the number of devices exceeding the maximum number of devices able to communicate with each other are switched to a park mode and not only the devices switched to the park mode are switched continually in keeping with a predefined strategy to active and active devices to parked.

Accordingly, at least one further device is switched to the park mode in addition to the minimum number of devices requiring to be switched to the park mode. This has an advantage in that a device can be switched quickly to the active mode and another device will not first have to be switched to the park mode. An accelerated procedural flow will be ensured thereby.

Regarding the master device, the master device has a device manager that controls the above-described method according to the disclosure in an appropriate manner.

If a strategy of proceeding in timeslices is employed for switching parked devices to the active mode, that will have an advantage in that none of the parked devices will have to wait too long for its own turn.

If a strategy of taking priority criteria into consideration for switching parked devices to the active mode, that will have an advantage in that operations given a higher priority will be carried out more quickly.

If a mixture of the strategies described above is employed for switching parked devices to the active mode, that will further optimize the overall flow.

One possibility for taking priority criteria into consideration is to analyze and suitably take account of the data rates of the devices.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 1 is a schematic illustration of a protocol stack having a supplement according to an exemplary embodiment; and FIG. 2 is a schematic illustration of the flow of the embodiments of FIG. 1.

DETAILED DESCRIPTION

FIG. 1 shows functional units of a "protocol stack" (stack) SURFBLUE implementing the method according to an exemplary embodiment, with a "protocol stack" understood generally as being protocol software for adjacent, interdependent layers of the OSI reference model that functionally belong together. The software generally serves to implement specific network architectures.

The architecture of the SURFBLUE stack shown in FIG. 1 is preferably implemented in a host HOST accommodating a Bluetooth module, and communicates with other layers (application and transport layer) or, as the case may be, with BT APPLICATION, DRIVER, and TRANSPORT LAYER units assigned thereto, via an external interface 1 provided for the purpose.

The SURFBLUE stack has a plurality of protocols. One protocol specified according to the Bluetooth standard (core protocol) is the "Logical Link Control and Adaptation Protocol" L2CAP which, for stackable protocols, enables connection-oriented and connectionless (loopback) connections for higher protocol layers.

The Logical Link Control and Adaptation Protocol L2CAP has a connection to a "Telephony Control protocol Specification" TCS via an internal interface 2. The Telephony Control protocol Specification TCS generally includes a bit-oriented protocol which implements ring control, connection setup, voice transmission, and data transmission; as well as using AT commands for cell phones and modems for controlling these or for a type of FAX transmission.

The Logical Link Control and Adaptation Protocol L2CAP is additionally connected via the internal interface 2 to a serial cable emulation protocol RFCOMM defined according to ETSI ZS 07.10 and serving above the Logical Link Control and Adaptation Protocol L2CAP to emulate an RS232 connection, such as ETSI TS 07.10 in the case of GSM, for example for direct controlling via AT commands.

Via the internal interface 2, the Logical Link Control and Adaptation Protocol L2CAP furthermore has a connection to a locating protocol (Service Discovery Protocol) SDP which is responsible for locating the services offered by Bluetooth devices within radio range and itself communicates via the internal interface 2 with the adaptation layer ADAPTATION of the OSI reference model.

The Logical Link Control and Adaptation Protocol L2CAP furthermore also communicates with a Host Controller Interface HCI which is necessary when a Bluetooth device is controlled via the host HOST.

For this purpose, the Host Controller Interface HCI communicates with a plurality of the described protocols and layers such as, for instance, the ADAPTATION layer, via the internal interface 2, or the TRANSPORT layer, via the external interface 1.

For implementing process management or, as the case may be, operating the SURFBLUE stack, the SURFBLUE stack has a few further modules such as, for instance, the SECURITY-MANAGEMENT module, for implementing security-relevant processes that are connected therefor via the internal interface to at least the Logical Link Control and Adaptation Protocol L2CAP, the locating protocol SDP, and the Host Controller Interface HCI, the DI-MANAGEMENT module for implementing device interface management, and an RX/TX-BUFFER MANAGEMENT module for implementing receive/transmit buffer management.

The protocol stack SURFBLUE furthermore has a power-saving device POWER-SAVE MANAGER and a device manager DEVICE MANAGER that is connected to at least the adaptation layer ADAPTATION via its own adaptation layer power management interface 3 and the Host Controller Interface via an HCI Host Controller Interface power management interface for implementing the; process, shown in FIG. 2.

With reference to FIG. 2, the following factors have been taken into account in order to simplify the presentation of the exemplary embodiment.

In the example, the maximum possible number of active devices is set at 3 devices. The maximum number of devices that can be switched to the park mode is also set at 3 devices. The devices G1, G2, and G3 send data. The device G4 does not send any data.

In the beginning, device G3 is in the park mode. The letter A in the Figure represents an active device. The letter P represents a parked device. The sequence of letters MUX represents a device which, although it sends data, is switched to the parked mode and is waiting to be switched to the active mode again. The letter M represents the master device performing controlling.

In the embodiment illustrated in FIG. 2, it is assumed that a possibility of switching a device to the active mode has been reserved.

Proceeding from the device G3, which wishes to send data and is in the parked mode, the device G3 will be switched to the active condition.

To accomplish this, one option is to switch the device G1 to the parked condition at this point. The device G1 will still continue to send data until the data memory is full. The device G1 will then wait until it is switched to the active condition again. That will be the case when another connection has finished transferring data. When it has, the device G1 will be switched to the active condition again.

Accordingly, the option will include switching the device G2 to the parked condition at this point. The device G2 will still continue to send data until the data memory is full. The device G2 will then wait until it is switched to the active condition again. That will be the case when another connection has finished transferring data. When it has, the device G2 will be switched to the active condition again.

As a result, the device G3 is switched to the parked condition at this point. The device G3 will still continue to send data until the data memory is full. The device G3 will then wait until it is switched to the active condition again. That will be the case when another connection has finished transferring data. When it has, the device G3 will be switched to the active condition again.

This requires, for example, switching the device G1 to the parked condition again at this point, and the operation will resume at the point X1. It would also have been possible for the operation to resume at the point X2.

It should be understood that the various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A method for operating a short haul radio transmitting/radio receiving system comprising:
   determining a maximum number of devices that may communicate with a master device;
   determining devices present that exceed the maximum number;
   switching devices that exceed the maximum number to a park mode;
   switching the parked devices exceeding the maximum number into an active mode, according to a predefined strategy;
   continually switching active devices into a park mode according to the predefined strategy; and
   switching at least one further device, in addition to a minimum number of devices switched to the park mode, from an active mode device to a park mode.

2. The method as claimed in claim 1, wherein the predefined strategy is based on timeslices that are cyclically assigned to the individual devices.

3. The method as claimed in claim 1, wherein the predefined strategy is based on priority criteria according to which a dynamically changeable sequence of devices is specified in which the parked devices are switched to the active mode.

4. The method as claimed in claim 3, wherein the data rate of the individual devices is used as the priority criterion.

5. The method as claimed in claim 3, wherein the predefined strategy further comprises a timeslice assignment cyclically assigned to each device that is combined with the priority criteria.

* * * * *